United States Patent
Park et al.

(10) Patent No.: US 11,192,330 B2
(45) Date of Patent: Dec. 7, 2021

(54) POROUS STRUCTURE AND METHOD OF FABRICATING THE SAME

(71) Applicant: UNIVERSITY-INDUSTRY FOUNDATION (UIF), YONSEI UNIVERSITY, Seoul (KR)

(72) Inventors: Hyung Ho Park, Seoul (KR); Hee Yoon Chung, Gyeonggi-do (KR); Hae Noo Ree Jung, Seoul (KR); Tae Won Lee, Seoul (KR)

(73) Assignee: UNIVERSITY-INDUSTRY FOUNDATION (UIF), YONSEI UNIVERSITY, Seoul (KR)

( * ) Notice: Subject to any disclaimer, the term of this patent is extended or adjusted under 35 U.S.C. 154(b) by 717 days.

(21) Appl. No.: 15/607,119

(22) Filed: May 26, 2017

(65) Prior Publication Data

US 2017/0341280 A1    Nov. 30, 2017

(30) Foreign Application Priority Data

May 31, 2016 (KR) .......................... 10-2016-0067408

(51) Int. Cl.
  *B32B 5/14* (2006.01)
  *C04B 38/00* (2006.01)
  *C01F 7/36* (2006.01)
  *B29K 105/04* (2006.01)

(52) U.S. Cl.
  CPC .............. *B32B 5/145* (2013.01); *C01F 7/36* (2013.01); *C04B 38/0045* (2013.01); *B29K 2105/041* (2013.01); *B29K 2105/045* (2013.01); *B29K 2995/0002* (2013.01); *B29K 2995/0015* (2013.01); *C01P 2006/12* (2013.01); *C01P 2006/16* (2013.01); *C01P 2006/32* (2013.01); *C01P 2006/90* (2013.01)

(58) Field of Classification Search
  CPC ....... B32B 5/145; C04B 38/0045; C01F 7/36; C01F 7/02; B29K 2995/0002; B29K 2105/041; B29K 2995/0015; B29K 2105/045; C01P 2006/90; C01P 2006/12; C01P 2006/32; C01P 2006/16; C01P 2004/34; C01P 2004/64; C07F 5/06
  See application file for complete search history.

(56) References Cited

U.S. PATENT DOCUMENTS 8,133,301 B2 *   3/2012  Hwang ............... B01J 31/1691
                                                    95/27
2010/0075123 A1 *  3/2010  Masel .................. C07C 51/412
                                                    428/219

(Continued)

*Primary Examiner* — Cynthia L Schaller

(57) ABSTRACT

Provided are a porous structure and a method of fabricating the same. The porous structure may include an aluminum oxide containing at least one of fluorine and phenyl group. For example, the porous structure may be formed from alumina which contains fluorine or phenyl group. The method of fabricating the porous structure may include preparing an aluminum precursor including at least one of fluorine and phenyl group; providing a precursor solution by mixing the precursor with a solvent; and forming the porous structure having 3-dimensional network structure including the aluminum oxide containing the at least one of fluorine and phenyl group from the precursor solution through gelation.

12 Claims, 5 Drawing Sheets

FIG. 2A

(56) References Cited

U.S. PATENT DOCUMENTS

| | | | | |
|---|---|---|---|---|
| 2011/0319604 A1* | 12/2011 | Loiseau | ............... | C07F 5/069 534/602 |
| 2013/0112613 A1* | 5/2013 | Kang | ............... | B01D 67/003 210/500.21 |
| 2014/0287235 A1* | 9/2014 | Chang | ............... | B01J 20/28019 428/402 |
| 2015/0152123 A1* | 6/2015 | Zhou | ............... | C01B 3/508 423/351 |
| 2015/0246318 A1* | 9/2015 | Jeong | ............... | B01D 71/028 427/595 |
| 2016/0089334 A1* | 3/2016 | Nakayama | ............... | C09D 11/00 424/489 |

* cited by examiner

POROUS STRUCTURE AND METHOD OF FABRICATING THE SAME

CROSS-REFERENCE TO RELATED APPLICATION

This application claims priority of Korean Patent Application No. 10-2016-0067408, filed on May 31, 2016, in the KIPO (Korean Intellectual Property Office), the disclosure of which is incorporated herein entirely by reference.

BACKGROUND OF THE INVENTION

Field of the Invention

The present disclosure relates to a porous material, and more particularly, to a porous material and a method of fabricating the same.

Description of the Related Art

A nanoporous structure has a 3-dimensional network structure in which a large number of pores are distributed and high porosity may lead to a specific surface area of several hundreds of m2/g or larger and low thermal conductivity (e.g., about 3 mW/mk or less). Furthermore, due to the large number of pores, the nanoporous structure may exhibit a low dielectric constant and a low refractive index. Therefore, the nanoporous structure may be applied to various fields, such as an insulating material, a soundproof material, a catalyst material, a supercapacitor material, and an electrode material.

However, despite of excellent material properties and wide applicability of a nanoporous structure, usability of such nanoporous structure is yet very limited. In particular, low mechanical strength of the nanoporous structure tends to limit the usability of a nanoporous structure. To enhance the mechanical strength of a nanoporous structure, combining a nanoporous structure with a polymer, such as polyvinyl butyral (PVB), polyvinylpyrrolidone (PVP), 3-aminopropyl triethoxysilane (APTES), and bisphenol A diglycidyl ether (BADGE), and forming a nanoporous structure blanket by combining a nanoporous structure with a fiber are suggested and researched. However, when a polymer is utilized, strength-wise properties may be improved, but thermal stability may be deteriorated. Furthermore, the nanoporous structure blanket may also exhibit deteriorated heat stability due to its fibrous composite structure. As described above, various researches have been made to improve the mechanical strength of a nanoporous structure, but there are problems where the additives, e.g., polymer, fiber, etc. may cause deterioration of thermal stability and reduction of porosity may cause reduction of a specific surface area, increase of thermal conductivity, and increase of density.

SUMMARY OF THE INVENTION

Provided is a porous structure with improved mechanical strength and flexibility without deteriorating a specific surface area or thermal conductivity.

According to present disclosure, a porous structure comprising a 3-dimensional network structure having pores distributed therein may be provided. The 3-dimensional network structure may comprise at least one of fluorine and a phenyl group.

In an example, the porous structure may have temperature stability preventing the porous structure from being collapsed or decomposed at a temperature of about 500° C. or higher. The porous structure may be flexible. In an example, the porous structure may be hydrophobic.

In an example, the porous structure may have porosity of 50 vol % or higher. The porous structure may have a specific surface area of 350 m$^2$/g or larger. The porous structure may have thermal conductivity lower than or equal to 0.03 W/mk. The average pore diameter of the porous structure may be within the range from 10 nm to 50 nm.

Provided is method of fabricating a porous structure having the above-stated advantages.

In an example, the method may include: preparing an aluminum precursor comprising at least one of fluorine and phenyl group; providing a precursor solution by mixing the precursor with a solvent; and forming the porous structure having 3-dimensional network structure comprising an aluminum oxide containing at least one of fluorine and phenyl group from the precursor solution through gelation.

The aluminum precursor may be an organic precursor comprising the at least one of fluorine and phenyl group. The organic precursor may comprise trimethylaluminum, triethylaluminum, dimethylaluminum hydride, diethylhydride aluminum, methyldihydroaluminum, aluminum tri-sec butoxide, aluminum triisopropoxide (chemical formula: Al(OCH(CH$_3$)$_2$)$_3$), or alkylaluminum hydride (chemical formula: [(C$_x$H$_y$)$_3$-aAlHa]$_n$ (here, x has a value from 1 to 3, y is 2x+2, a has a value from 1 to 2, and n has a value from 1 to 4)).

The solvent may be a carbonate-based solvent, an ether-based solvent, or a ketone-based solvent. Acid catalyst may be added to the precursor solution. The acid catalyst may comprise acetic acid or nitric acid.

The porous structure may have temperature stability preventing the porous structure from being collapsed or decomposed at a temperature of about 500° C. or higher.

Provided may be blocking/protecting member having the above-stated advantages. In an example, the blocking/protecting member, wherein pores are distributed in a 3-dimensional network structure, and at least a portion of the 3-dimensional network structure comprises a porous structure including an aluminum oxide containing at least one of fluorine and phenyl group.

The blocking/protecting member may comprise a heat insulation member, a soundproof member, or a separating film. The blocking/protecting member may have film-like shape or particle-like shape.

Additional aspects will be set forth in part in the description which follows and, in part, will be apparent from the description, or may be learned by practice of the presented embodiments.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
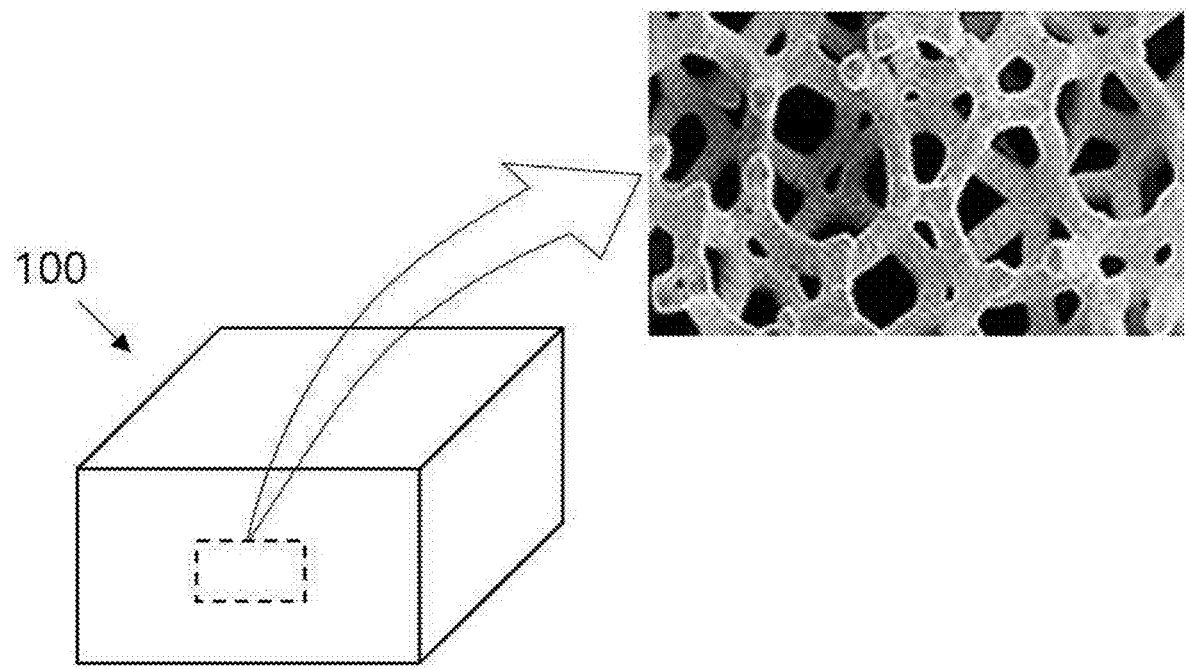
FIG. 1 is a diagram showing a porous structure according to an embodiment of the present disclosure.

In the following description, the same or similar elements are labeled with the same or similar reference numbers.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIG. 1 is a diagram showing a porous structure 100 according to an embodiment of the present disclosure.

Referring to FIG. 1, the porous structure 100 may have a 3-dimensional network structure in which a plurality of frames are connected to one another, and pores may be formed between and around frames constituting the 3-dimensional network structure. The porous structure 100 may include an aluminum oxide containing at least one of fluorine (F) and a phenyl group ($C_6H_5$—). The alumina containing fluorine or a phenyl group may be a main ingredient of the porous structure 100. In one embodiment, in the porous structure 100, a line type structure of the aluminum oxide is connected with an adjacent line type structures of the aluminum oxide to form the plurality of frames constituting the integrated 3-dimensional network structure, without conventional additives for additional reinforcement, such as a polymer or binder.

The porous structure 100 may have excellent mechanical strength due to fluorine and/or a phenyl groups contained therein. Moreover, the porous structure 100 may have flexibility due to the pores of 3-dimensional network structure. The mechanical strength and flexibility of the porous structure 100 may be attributed to the fluorine or the phenyl group which act like a defect or acts as a flexible elastomer in the 3-dimensional network structure. The flexibility of the porous structure 100 means that, when an external force is applied to the porous structure 100, the porous structure 100 may be bent according to a certain level of the external force and, when the external force is removed, the porous structure 100 may be restored to its original state.

The porosity of the porous structure 100 may be adjusted within the range from 10% to 99%, and may preferably be within the range from 70% to 95%. The porosity of the porous structure 100 may be appropriately adjusted by considering required strength and flexibility. As the porosity of the porous structure 100 increases, the hardness is decreased, but the flexibility may be increased. In this case, the porous structure 100 having porosity more than 80% may be an aerogel. On the contrary, as the porosity decreases, the hardness may increase, but the flexibility may decrease. However, in any case, according to an embodiment of the present disclosure, due to the 3-dimensional network structure, the porous structure 100 may have a high porosity as well as a sufficient strength to prevent the porous structure from being easily ruptured or broken by an external force.

The porous structure 100 may exhibit excellent high-temperature stability due to the fluorine and/or the phenyl group. For example, a phenyl group may have a burning point (or, combustion point) higher than about 600° C., and fluorine may also have a high burning point (about 600° C. or higher) similar to the phenyl group. Therefore, the porous structure 100 including the aluminum oxide containing fluorine and/or a phenyl group may have high temperature stability preventing the porous structure 100 from being collapsed or decomposed at a temperature of about 500° C. or higher. Therefore, the porous structure 100 may exhibit excellent mechanical stability, flexibility, and, simultaneously secure the high-temperature stability.

Furthermore, when the porous structure 100 does not include reinforcing additives, such as a polymer or an organic binder, the problem that may be caused by the reinforcing additives, e.g., reductions in porosity and specific surface area and increase in the thermal conductivity and density, may be prevented. Therefore, the porous structure 100 without the polymer or binder, may exhibit high porosity, high specific surface area, low thermal conductivity, and low density.

The porous structure 100 may exhibit a specific surface area of at least about 350 m2/g. The specific surface area of the porous structure 100 may be as high as about 400 m2/g or higher, for example, about 500 m2/g. The porous structure 100 may also exhibit a thermal conductivity of less than or equal to about 0.03 W/mk. The thermal conductivity of the porous structure 100 may be as low as about 0.01 W/mk or lower, for example, 0.005 W/mk. On the other hand, the average pore diameter of the porous structure 100 may be within the range from about 10 nm to about 0.5 mm. Generally, the pores of the porous structure 100 may be in a nanoscale. In this case, the porous structure 100 may be referred to as a 'nanoporous structure'. In some examples, some of the pores of the porous structure 100 may be in a microscale.

According to an embodiment, the porous structure 100 may have hydrophobic property due to the fluorine or the phenyl group contained therein. When the porous structure 100 has the hydrophobic property, the degradation or the deterioration of properties due to moisture adsorption may be reduced or suppressed. In this view, the hydrophobic property may become advantageous for various applications, e.g., a coating layer formed from the porous structure 100.

As described above, the porous structure 100 according to an embodiment of the present disclosure may exhibit high-temperature stability, flexibility, and excellent mechanical strength and may also exhibit has high specific surface area, low thermal conductivity, low density (super lightweight), and hydrophobic surface property. Therefore, the porous structure 100 may resolve various problems of conventional nanoporous structures and may significantly improve commercialization possibility and utilization value of nanoporous structures.

FIGS. 2A through 2D are diagrams for describing method of fabricating a porous structure according to an embodiment of the present disclosure.

Figure 2A:
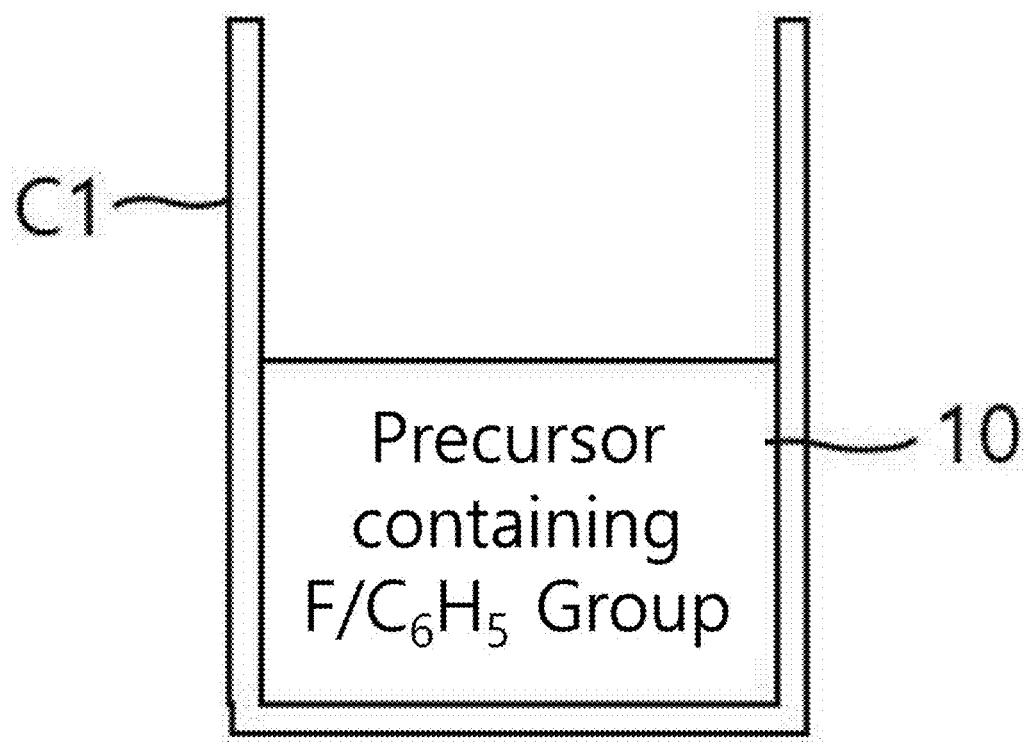
FIGS. 2A through 2D are diagrams for describing a method of fabricating a porous structure according to an embodiment of the present disclosure.

Referring to FIG. 2A, an aluminum precursor 10 to which a functional group (ligand) stable at a high temperature is attached may be provided in a predetermined container (hereinafter referred to as a first container) C1. The functional group stable at a high temperature may have a combustion point of about 600° C. or higher, for example. The high temperature stable functional group may be at least one of fluorine (F) and a phenyl group ($C_6H_5$—). In this view, the high temperature stable functional group may be referred to as a high temperature stable inert group. The aluminum precursor 10 containing such a functional group may be, for example, an organic precursor including at least one of fluorine and a phenyl group. For example, the organic precursor may include trimethylaluminum, triethylaluminum, dimethylaluminum hydride, diethylhydride aluminum, methyldihydroaluminum, aluminum tri-sec butoxide, aluminum triisopropoxide (chemical formula: $Al(OCH(CH_3)_2)_3$), or alkylaluminum hydride (chemical formula: $[(C_xH_y)_3\text{-}aAlHa]_n$ (here, x has a value from 1 to 3, y is 2x+2, a has a value from 1 to 2, and n has a value from 1 to 4)). However, it is merely an example, and the present embodiments are not limited thereto. The organic precursor 10 may have a liquid or solid phase at the room temperature.

Figure 2B:
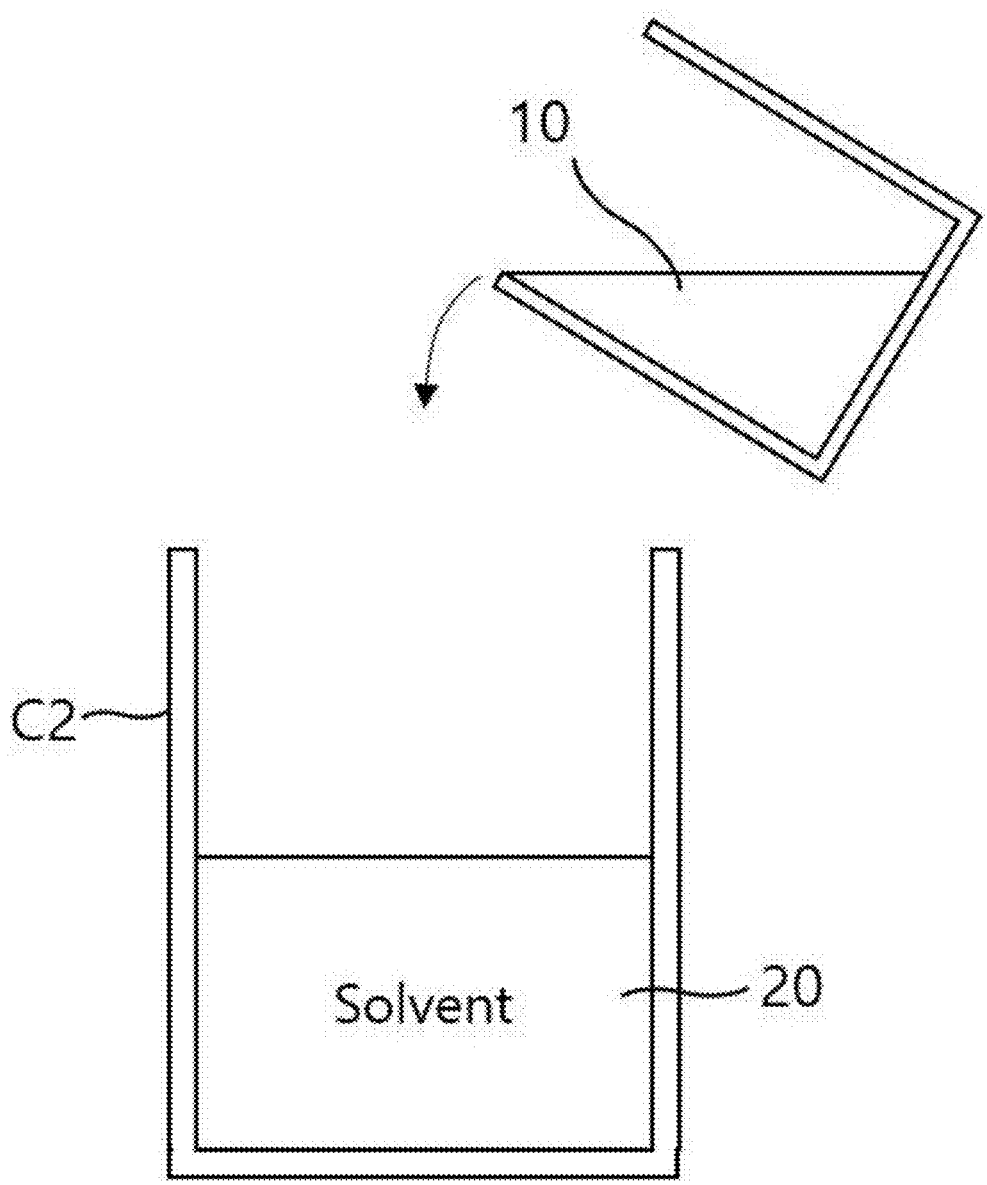
Figure 2C:
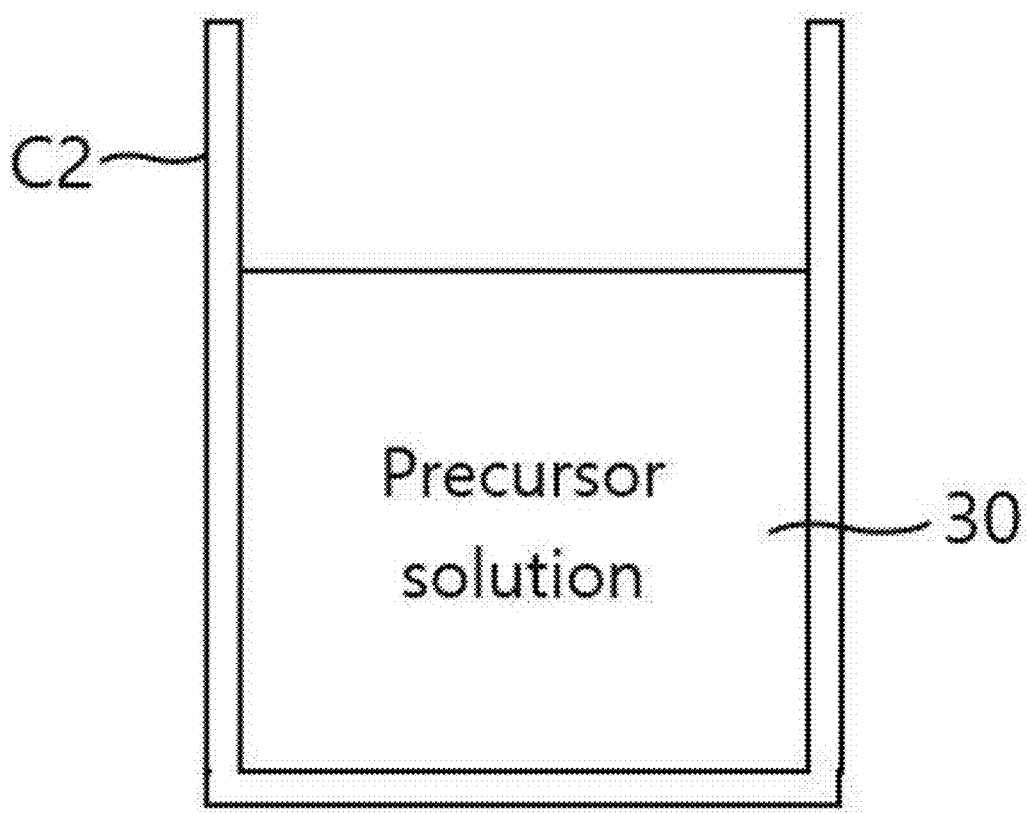

Referring to FIG. 2B, after a predetermined solvent 20 may be provided in a second container C2, a mixed solution may be formed by mixing the precursor 10 with the solvent 20. Next, a stirring process may be performed on the mixed solution. As a result, a precursor solution 30 as shown in FIG. 2C may be obtained. The precursor 10 may be uniformly dispersed or dissolved in the precursor solution 30. The solvent (20 in FIG. 2B) used herein may be an organic solvent. Specifically, the solvent 20 may be an alcohol-based solvent, such as methanol, ethanol, or isopropyl alcohol. However, types of the solvent 20 are not limited to the above-stated alcohol-based solvents, and the organic solvent may be, for example, a carbonate-based solvent, an ether-based solvent, or a ketone-based solvent. For example, the carbonate-based solvent may include dimethyl carbonate (DMC), diethyl carbonate (DEC), dipropyl carbonate (DPC), methylpropyl carbonate (MPC), ethyl propyl carbonate (EPC), methyl ethyl carbonate (MEC), ethylene carbonate (EC), propylene carbonate (PC), or butylene carbonate (BC). The ester solvent may include methyl acetate, ethyl acetate, n-propyl acetate, 1,1-dimethyl ethyl acetate, methyl propionate, ethyl propionate, γ-butyrolactone, decanolide, valerolactone, mevalonolactone, or caprolactone.

In other example for the organic solvent, the ether solvent may include dibutyl ether, tetraglyme, diglyme, dimethoxyethane, 2-methyltetrahydrofuran, or tetrahydrofuran, and the ketone-based solvent may include cyclohexanone. One of the organic solvent may be used singly or two or more of the organic solvents may be used in combination.

Figure 2D:
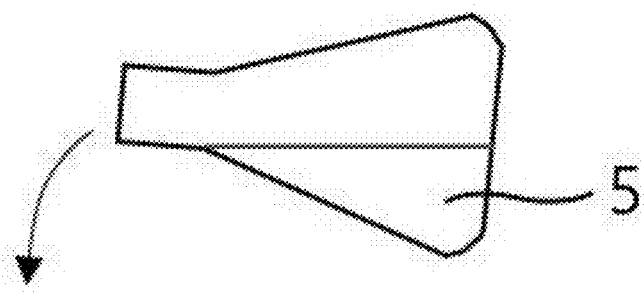
Figure 2D:
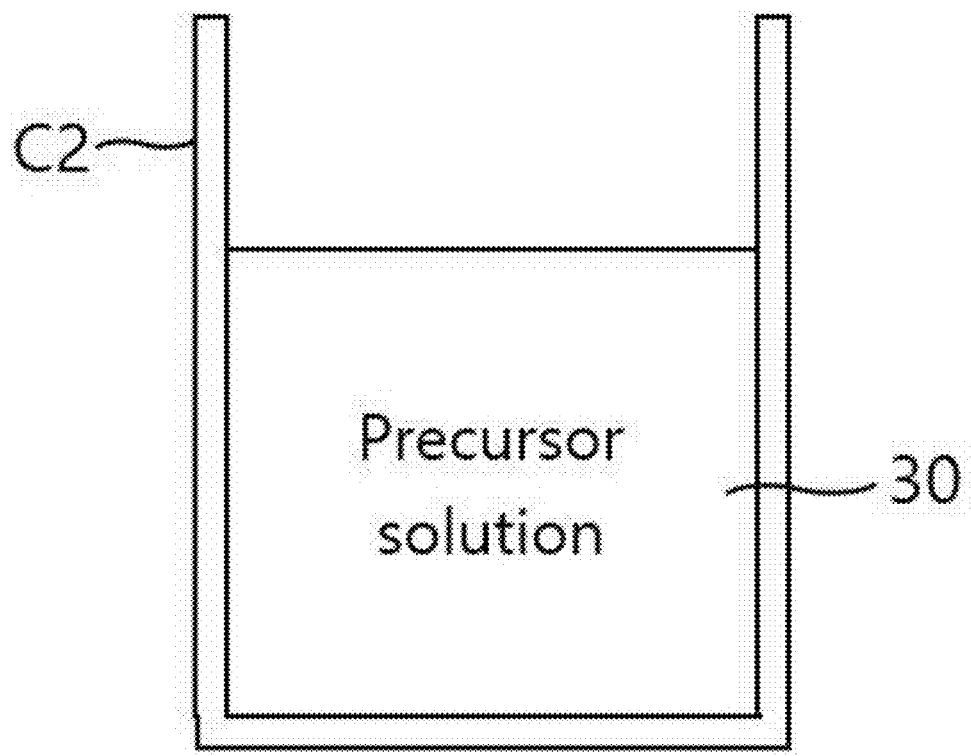

Referring to FIG. 2D, according to an embodiment, a predetermined catalyst 5 may be further added to the precursor solution 30. The catalyst 5 may induce and/or accelerate hydrolysis reaction of the precursor. The catalyst 5 may be, for example, an acid catalyst. As an example, the catalyst 5 may include acetic acid ($C_2H_4O_2$) or nitric acid ($HNO_3$). However, the catalyst 5 is not limited thereto and may be variously selected. After the catalyst 5 is added, a stirring operation may be further performed to disperse or dissolve the catalyst 5 in the precursor solution 30. The stirring operation may be performed at a speed of about several hundred rpm, e.g., about 400 rpm. However, it is merely an example, and the present disclosure is not limited thereto.

After the hydrolysis reaction of the precursor solution 30 due to the catalyst 5 occurs, a gelating operation through a condensation reaction may occur. Such a reaction operation (hydrolysis reaction and condensation reaction) may be performed at a predetermined temperature and under a predetermined pressure. For example, the above-stated reaction operations may be performed at a temperature of about 200° C. and under a pressure of about 150 bar. However, the temperature and the pressure are merely examples and may vary according to reaction times and reaction conditions.

Next, a predetermined drying operation may be performed on the gelated material formed from the precursor solution 30 to remove the solvent from the gelated material. As a result, the porous structure 100 as shown in FIG. 1 may be obtained. The 3-dimensional network of the porous structure 100 may include an aluminum oxide (or called as alumina) including at least one of fluorine and a phenyl group. The porous structure 100 may have high temperature stability, flexibility and excellent mechanical strength, and may also have surface properties of high specific surface area, low thermal conductivity, low density (light weight) and hydrophobic surface property. Furthermore, according to an embodiment of the present disclosure, the porosity, the pore size, the density, and the mechanical strength of the porous structure 100 may be controlled by adjusting materials, concentrations, and amounts of the precursor 10, the solvent 20, and the catalyst 5. For example, as the molecular concentration of the precursor 10 and the catalyst 5 increase, the porosity and the pore size may be reduced, and thus the hardness of the porous structure 100 may increase. The opposite case also hold true.

The method described with reference to FIGS. 2A through 2D may be referred to be method of fabricating a porous structure 100 using a sol-gel operation. The specific operational conditions described with reference to FIGS. 2A through 2D are merely examples and may vary as occasions demand.

Figure 3:
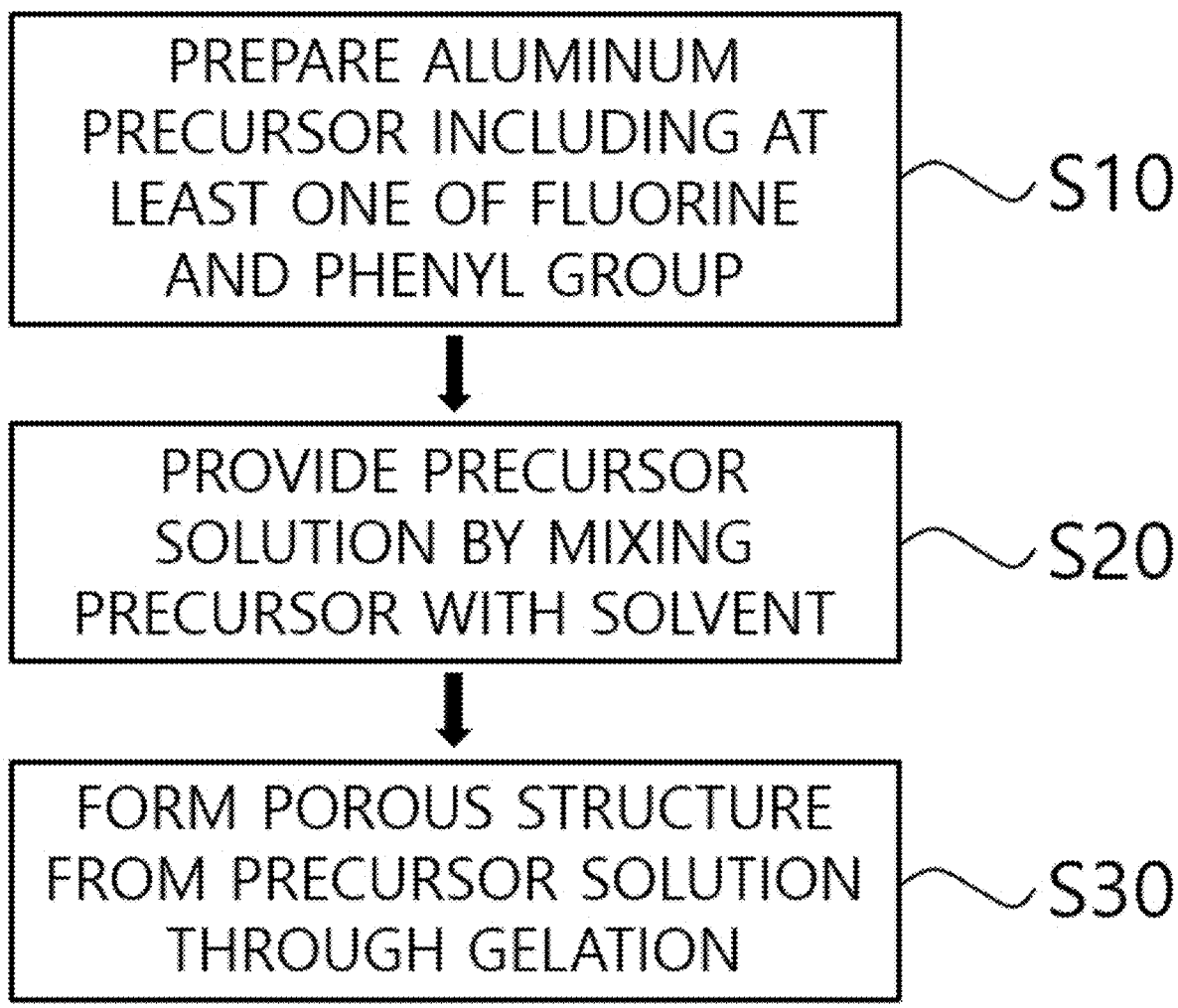
FIG. 3 is a flowchart showing a sequence of fabricating a porous structure according to an embodiment of the present disclosure.

FIG. 3 is a flowchart showing a sequence of fabricating a porous structure according to an embodiment of the present disclosure.

Referring to FIG. 3, a method of fabricating a porous structure according to an embodiment of the present disclosure may include providing an aluminum precursor including at least one of fluorine and a phenyl group (operation S10), forming a precursor solution by mixing the precursor with a solvent (operation S20), and forming a porous structure from the precursor solution through gelation (operation S30). In operation S10, the aluminum precursor 10 may be, for example, an organic precursor including fluorine and/or a phenyl group. For example, the organic precursor may include trimethylaluminum, triethylaluminum, dimethylaluminum hydride, diethylhydridaluminum, methyldihydroaluminum, aluminum tri-sec butoxide, aluminum triisopropoxide (formula: $Al(OCH(CH_3)_2)_3$) or alkyl aluminum hydride (formula: $[(C_xH_y)_3\text{-aAlHa}]_n$; here, 'x' may have a value from 1 to 3, 'y' may be 2x+2, 'a' may have a value from 1 to 2, and 'n' may have a value from 1 to 4). However, it is merely an example, and the present disclosure is not limited thereto. The organic precursor 10 may have liquid or solid phase at the room temperature.

In operation S20, the solvent may be an organic solvent, such as an alcohol-based solvent, a carbonate-based solvent, an ether-based solvent, or a ketone-based solvent. The porous structure formed in operation S30 may include an aluminum oxide (alumina) including at least one of fluorine and a phenyl group. Furthermore, an operation for adding a predetermined catalyst to the precursor solution may be further performed in operation S30. The catalyst may be, for example, an acid catalyst, such as acetic acid ($C_2H_4O_2$) or nitric acid ($HNO_3$). Through the process, the porous structure 100 as shown in FIGS. 1 and 2E may be obtained.

In operation S20, the solvent may be an organic solvent, such as an alcohol-based solvent, a carbonate-based solvent, an ether-based solvent, or a ketone-based solvent. The porous structure formed in operation S30 may include an aluminum oxide (alumina) including at least one of fluorine and a phenyl group. Furthermore, an operation for adding a predetermined catalyst to the precursor solution may be further performed in operation S30. The catalyst may be, for example, an acid catalyst, such as acetic acid ($C_2H_4O_2$) or nitric acid ($HNO_3$). Through the process, the porous structure 100 as shown in FIGS. 1 and 2E may be obtained.

The porous structure 100 according to the embodiments described above may be applied as a (super) heat insulating material, a soundproof material, a low dielectric material, or a separating film for a flexible battery. Furthermore, the porous structure 100 may be applied for various purposes in various industrial fields from high-tech electronic devices to space materials. In particular, the porous structure 100 according to an embodiment of the present disclosure may be utilized as an environment-friendly material capable of replacing a conventional heat insulating material. In this case, the significant reduction of heat energy loss may be expected due to the improved heat insulating performance of the porous structure. Furthermore, since the porous structure 100 has the performance including ultra-lightweight as well as super heat insulation, the porous structure 100 may be utilized as material for spacesuit or material for protecting electronic devices in the field of the space industry. Furthermore, the porous structure 100 may be utilized as a material for replacing some of conventional plastic products. According to an embodiment of the present disclosure, the porous structure 100 having a high specific surface area and excellent mechanical strength and flexibility may be implemented. Therefore, various problems or disadvantages of conventional nanoporous structures may be resolved, and commercialization possibility and applicability of a material (that is, a porous structure/nanoporous structure) may significantly increase.

The application fields specifically stated herein are merely examples, and the porous structure 100 may be utilized in various other fields as well. Furthermore, the shape and size of the porous structure 100 may vary. For example, the porous structure 100 may have a thin-film-like shape or a particle-like shape other than a bulk shape and may have various other shapes.

According to an embodiment of the present disclosure, a 3-dimensional network structure of aluminum oxide having at least of fluorine and phenyl group, which is a high-temperature stable inert group, may provide a porous structure with improved mechanical strength without decreasing specific surface area and thermal conductivity.

Furthermore, the porous structure may be economically implemented because the mechanical strength may be enhanced without using other additives, such as polymer (binder) or fiber material.

Furthermore, according to an embodiment of the present disclosure, a porous structure having excellent high-temperature stability and flexibility and simultaneously having high porosity, high specific surface area, low thermal conductivity, and excellent mechanical strength may be implemented. Furthermore, a porous structure having hydrophobic property may be embodied.

While many matters have been described in detail in the above description, they should not be construed as limiting the scope of the invention, but rather should be construed as illustrative examples.

For example, one of ordinary skill in the art will understand that various modifications may be made in the porous structure of FIG. 1 and the fabrication operations shown in FIGS. 2A through 2E. The composition of fabricated porous structure (e.g., a nanoporous structure) may vary. Furthermore, it would be understood that a porous structure according to embodiments may be applied for various purposes in various fields other than heat insulating material, soundproof material, and space industry material.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A porous structure comprising a 3-dimensional network structure having pores distributed therein, the 3-dimensional network structure comprising an alumina containing at least one of fluorine and phenyl group ($C_6H_5$—), wherein the fluorine or the phenyl group is included in the alumina as a ligand, and the porous structure has hydrophobic property due to the fluorine or the phenyl group, wherein the alumina containing at least one of the fluorine and the phenyl group is a main component of the porous structure, and a line type structure of the alumina is connected with adjacent line type structures of the alumina to form a plurality of frames constituting the 3-dimensional network structure, wherein an average pore diameter of the porous structure is greater than 10 nm and equal to or smaller than 50 nm, wherein the porous structure has temperature stability preventing the porous structure from being collapsed or decomposed at a temperature higher than 500° C., and wherein the porous structure has flexibility due to the fluorine or the phenyl group which act as a defect or a flexible elastomer in the 3-dimensional network structure.

2. The porous structure of claim 1, wherein the porous structure has porosity of 50 vol % or higher.

3. The porous structure of claim 1, wherein the porous structure has a specific surface area of 350 m$^2$/g or larger.

4. The porous structure of claim 1, wherein the porous structure has thermal conductivity lower than or equal to 0.03 W/mk.

5. The porous structure of claim 1, wherein both of the fluorine and the phenyl group are included in the alumina as ligand.

6. A blocking/protecting member, wherein pores are distributed in a 3-dimensional network structure, and at least a portion of the 3-dimensional network structure comprises a porous structure including an alumina containing at least one of fluorine and phenyl group ($C_6H_5$—), wherein the fluorine or the phenyl group is included in the alumina as a ligand, and the porous structure has hydrophobic property due to the fluorine or the phenyl group, wherein the alumina containing at least one of the fluorine and the phenyl group is a main component of the porous structure, and a line type structure of the alumina is connected with adjacent line type structures of the alumina to form a plurality of frames constituting the 3-dimensional network structure, wherein an average pore diameter of the porous structure is greater than 10 nm and equal to or smaller than 50 nm, wherein the porous structure has temperature stability preventing the porous structure from being collapsed or decomposed at a temperature higher than 500° C., and wherein the porous structure has flexibility due to the fluorine or the phenyl group which act as a defect or a flexible elastomer in the 3-dimensional network structure.

7. The blocking/protecting member of claim 6, wherein the blocking/protecting member includes one selected from a group consisting of a heat insulation member, a soundproof member, and a separating film.

8. The blocking/protecting member of claim 6, wherein the blocking/protecting member has a film shape or a particle shape.

9. The blocking/protecting member of claim 6, wherein the porous structure has porosity of 50 vol % or higher.

10. The blocking/protecting member of claim 6, wherein the porous structure has a specific surface area of 350 m$^2$/g or larger.

11. The blocking/protecting member of claim 6, wherein the porous structure has thermal conductivity lower than or equal to 0.03 W/mk.

12. The blocking/protecting member of claim 6, wherein both of the fluorine and the phenyl group are included in the alumina as ligand.

* * * * *